United States Patent [19]

Hatfield

[11] 3,868,368

[45] Feb. 25, 1975

[54] PROCESS FOR PREPARING A 7-AMINOCEPHALOSPORIN ESTER

[75] Inventor: Lowell D. Hatfield, Indianapolis, Ind.

[73] Assignee: Eli Lilly and Company, Indianapolis, Ind.

[22] Filed: Nov. 30, 1971

[21] Appl. No.: 203,398

[52] U.S. Cl. .............................. 260/243 C, 424/246
[51] Int. Cl. ............................................. C07d 99/24
[58] Field of Search............ 260/243 C, 239.1, 551 S

[56] References Cited
UNITED STATES PATENTS
3,669,980  6/1972  Bogash............................ 260/243 C

*Primary Examiner*—R. J. Gallagher
*Assistant Examiner*—Jose Tovar
*Attorney, Agent, or Firm*—Martens, Jr., William C.; Everet F. Smith

[57] ABSTRACT

Process for preventing reversion of an imino halide of a 7-acylamidodesacetoxycephalosporinate ester to a 7-acylamidodesacetoxycephalosporinate ester during treatment of the imino halide with an alcohol or thiol by reacting the imino halide of the 7-acylamidodesacetoxycephalosporinate ester with certain glycols or dithiols in an inert organic liquid diluent in the presence of hydrogen halide.

7 Claims, 3 Drawing Figures

REACTION OF THE IMINOCHLORIDE WITH METHANOL AT 25°C

EFFECT OF TEMPERATURE ON METHANOLYSIS OF THE IMINOCHLORIDE

EFFECT OF METHANOL, n-BUTANOL AND 1,3-PROPANEDIOL ON CLEAVAGE YIELD

PROCESS FOR PREPARING A 7-AMINOCEPHALOSPORIN ESTER

INTRODUCTION

This invention relates to processes for preparing cephalosporin compounds. More particularly, this invention provides an improved process for preparing cephalosporin nucleus ester salts which are useful as intermediates in processes for preparing cephalosporin antibiotics.

BACKGROUND OF THE INVENTION a. General Cephalosporin History

Cephalosporin C, obtained by fermentation, has been defined as having the following structure:

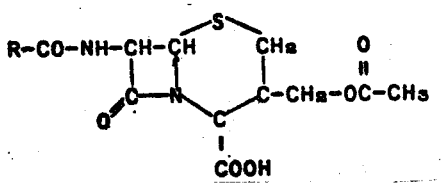

where R is $HOOC-CH(NH_2)-(CH_2)_3-$. It is also known as 7-(5'-aminoadipamido)cephalosporanic acid. It has weak antibiotic activity, but it is important as a source of cephalosporin C nucleus, i.e., 7-aminocephalosporanic acid (7-ACA), having the structural formula

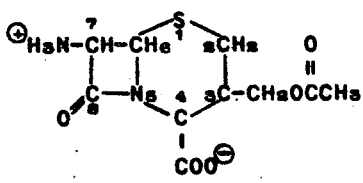

shown here in zwitterionic form, although anionic and cationic salts may be formed and used. Antibiotics such as cephalothin and cephaloridine are prepared from 7-ACA by known methods. Various derivatives of 7-ACA based antibiotics are made by acylating the 7-amino group of 7-ACA with appropriate acyl acids, halides, or other reactive form of such acyl groups and/or by replacing the acetoxy group attached to the 3-methyl carbon atom with appropriate nucleophilic groups now well documented in the literature.

In continued research, desacetoxycephalosporin compounds, i.e., compounds of the structure

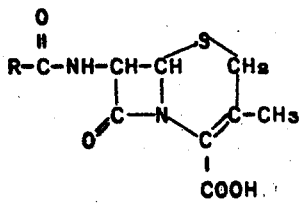

where R is the residue of the acyl group have been prepared. An important known antibiotically active compound in this class is cephalexin, an orally active cephalosporin antibiotic. Morin and Jackson (U.S. Pat. No. 3,275,626) discovered a process for preparing the desacetoxycephalosporanic acid derivatives by rearranging a penicillin sulfoxide ester to the corresponding desacetoxycephalosporin ester, and then removing the ester group. Desacetoxycephalosporanic acid derivative antibiotics are thus obtainable from a penicillin starting material. The compounds are sometimes, for convenience, referred to as being derivatives of 7-aminodesacetoxycephalosporanic acid (7-ADCA), having the structure

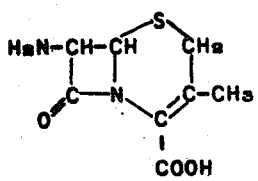

b. Cephalosporin and Penicillin Cleavage Process Prior Art

Various publications such as B. Fetig et al., *Helv. Chim. Acta*, Vol. 51, 1108 (1968); H. W. O. Weissenburger and M. G. Van Der Haven, *Rec. Trav. Chim.*, 89, 1081 (1969); G. R. Fosker, et al., *J. Chem. Soc.* (C), 1971, p. 1917; and R. R. Chauvette et al., *J. Org. Chem.* 36, 1259 (1971); and patents such as U.S. Pat. Nos. 3,234,223, 3,575,970, and 3,549,628 describe the use of phosphorus pentachloride in the chemical removal of the side chain acyl group from penicillins and cephalosporins. These processes provide the respective antibiotic nuclei, 6-aminopenicillanic acid (6-APA), 7-aminocephalosporanic acid (7-ACA), 7-aminodesacetoxycephalosporanic acid (7-ADCA), or derivatives thereof, for example, esters and salts.

The reaction scheme used to illustrate the mechanism of the $PCl_5$ cleavage process is outlined by the partial chemical structures below. The amide function of the side chain is converted to an imino chloride (I) upon reaction with $PCl_5$ and base (Step 1). The imino chloride (I) reacts subsequently with an alcohol to form an imino ether (II) (Step 2), which in turn is hydrolyzed to the nucleus (VI) and the side chain fragment (III) (Step 3). The nucleus (VI) is usually isolated from its reaction mixture as a zwitterion or as a sulfonate salt when the carboxyl group is blocked with an ester group. As indicated in the above references, step 1 occurs over a temperature range of −40°C. to 60°C. depending upon the particular cleavage reactants. Step 2 required very large volumes of alcohol; and the temperature range of −65°C. to −10°C. necessary for optimum alcoholysis results in various cases probably reflects the stability of the penicillin or cephalosporin nucleus under the acidic conditions in alcohol solution.

(1)

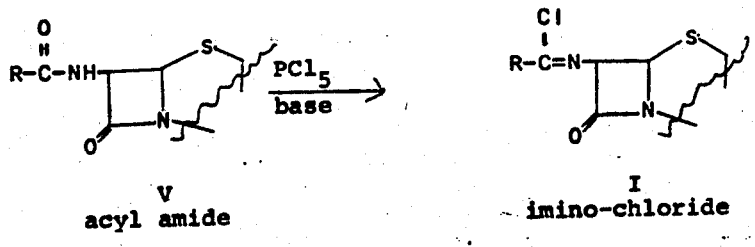

V
acyl amide

I
imino-chloride (2)

$I + R'-OH \longrightarrow$

II
Imino-ether

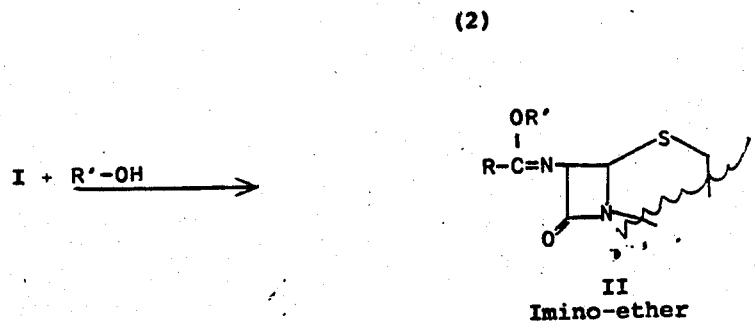

(3)

$II + H_2O \longrightarrow$

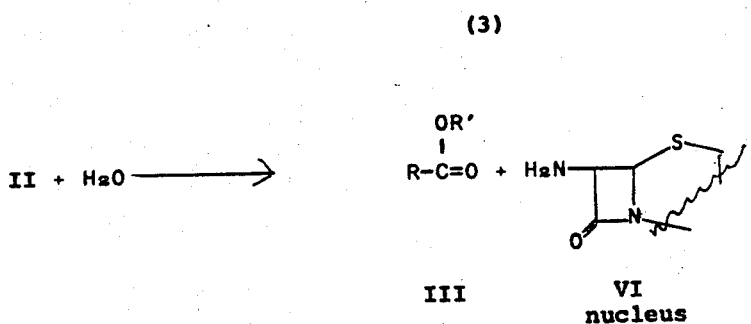

III        VI
                nucleus

Some of these processes are used commercially to prepare intermediates for use in manufacturing various penicillin or cephalosporin antibiotics, for example, ampicillin, cephalothin, cephaloridine, cephaloglycin, cephalexin and the like. Those in the art are seeking ways to produce the needed penicillin or cephalosporin nucleus compounds more efficiently.

It is an object of the present invention to provide a process for making penicillin and cephalosporin nuclei ester salts more efficiently than has previously been possible.

It is a specific object of this invention to provide a versatile process for making solid, crystalline 7-aminodesacetoxycephalosporin ester hydrohalide salts without the need for use of water in reaction mixture, which process can be used over a broad range of temperatures with efficient use of the reagents involved. Other objects, aspects, and advantages of the process of this invention will become apparent from the reading of the specification which follows.

SUMMARY OF THE INVENTION

This invention provides a process for preventing reversion of an imino halide of a 7-acylamidodesacetoxycephalosporinate ester to a 7-acylamidodesacetoxycephalosporinate ester (V) during treatment of the imino halide (I) with an alcohol or thiol which involves reacting the imino halide with certain alpha and beta diols and dithiols in an inert organic solvent in the presence of hydrogen halide to form the 7-aminodesacetoxycephalosporinate ester hydrohalide salt. I have discovered that with preferred ester groups such as the p-nitrobenzyl ester, the p-nitrobenzyl 7-aminodesacetoxycephalosporinate hydrohalide salt product precipitates and is easily separated from the organic solvent reaction mixture by conventional means. With this process, gross excesses of alcohol are not needed and water treatment is unnecessary. An optimum mole ratio of from 2 to 3 moles of the alpha or beta diol or dithiol per mole of the imino halide is all that is required.

DETAILED DESCRIPTION OF THE INVENTION

Figure 1:
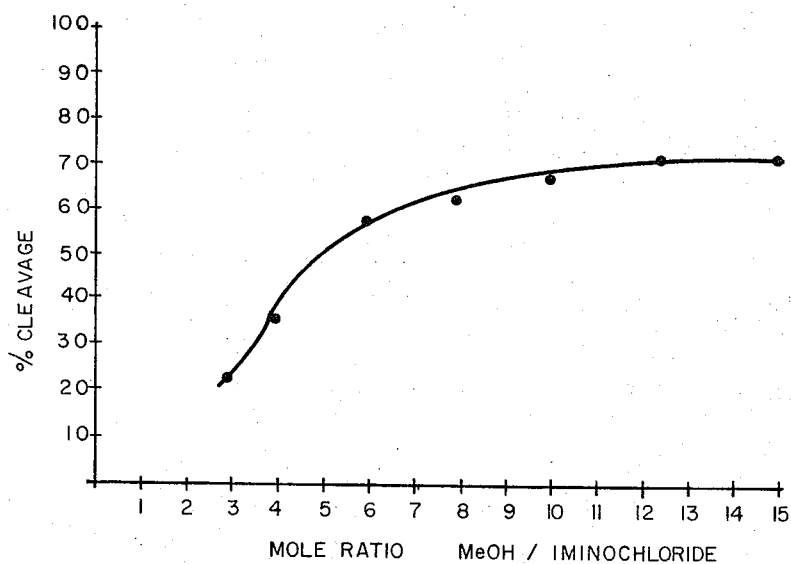
FIG. 1 is a graph plotting the mole ratio of methanol to imino chloride (abscissa) against the percent cleavage product (ordinate) illustrating the effect of the amount (in moles) of methanol on the yields of the desired nucleus ester salt product.

This invention relates particularly to processes to cleaving acyl side chains from desacetoxycephalosporinate esters and related cephalosporin compounds. In these processes the 7-acylamido desacetoxycephalosporinate ester is converted to an imino halide thereof. The prior art suggests treating these imino halide intermediates with methanol, isopropanol, n-butanol or similar alcohols to form an imino ether intermediate, which is then treated, e.g., with water, to cleave the imino ether and to form the 7-aminodesacetoxycephalosporinate ester nucleus compound. This invention relates to improvements in that cleavage process. I have discovered how to eliminate or substantially curtail the reversion of the imino halide intermediate to the 7-acylamidodesacetoxycephalosporinate ester or other acyl amide cephalosporin or penicillin starting material. This side reaction (reversion) occurs in this cleavage process when some alcohols are used as suggested by the prior art.

According to this invention, I have discovered a process for preparing 7-aminodesacetoxycephalosporinate ester hydrohalides while preventing reversion of an imino halide of a 7-acylamidodesacetoxycephalosporinate ester to a 7-acylamidodesacetoxycephalosporinate ester which comprises reacting the imino halide in an inert organic liquid diluent in the presence of hydrogen halide with an alpha or beta diol having one of the following general formulae (a) 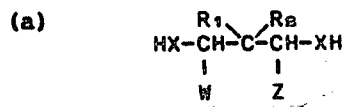

wherein each X is oxygen or sulfur, each of W and Z is hydrogen or $C_1$-$C_2$-alkyl, and each of $R_1$ and $R_2$ is hydrogen or a hydrocarbon moiety, e.g., as alkyl or phenyl, such that the compound has from 3 to about 15 carbon atoms; (referred to herein as beta diols and dithiols); or (b) 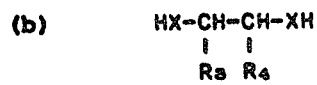

wherein each X is oxygen or sulfur, each $R_3$ and $R_4$ is hydrogen or alkyl such that the compound has from 2 to 12 carbon atoms (referred to herein as alpha or vicinal diol or dithiol compounds.

The diol or dithiol can be a mixed alcohol thiol, and mixtures of diols and dithiols can be used in the process.

The reaction of the improved process of this invention can be conducted over a broad range of liquid process conditions without substantial effect upon the yield of the desired 7-aminodesacetoxycephalosporinate ester salt product. With preferred ester groups exemplified hereinbelow, particularly, the p-nitrobenzyl ester, the 7-aminodesacetoxycephalosporinate ester salts can be obtained as easily handled, solid, crystalline materials in high yields.

Application of the discovery of this invention to a process for making 7-aminodesacetoxycephalosporinate ester salts is advantageous when the imino halide starting material is that of a 7-acylamidodesacetoxycephalosporinate ester derived from a penicillin, and converted to a 7-acylamidodesacetoxycephalosporinate ester by the Morin/Jackson penicillin sulfoxide ester ring expansion reaction (U.S. Pat. No. 3,275,626), especially as improved by Cooper (application Ser. No. 838,697, filed July 2, 1969, now allowed) and Hatfield (U.S. Pat. No. 3,591,585). The process can also be applied to esters of desacetoxycephalosporin C (U.S. Pat. No. 3,124,576) to form the desired 7-aminodesacetoxycephalosporinate esters. Esterification methods are well known and are exemplified by procedures disclosed in the above patent references, as well as in my U.S. Pat. No. 3,586,667.

The process of this invention can also be applied with advantage over prior art processes to the making of 6-aminopenicillanic acid (6-APA) ester salts from amino halides of penicillin esters and to 7-aminocephalosporanic acid (7-ACA) ester salts from esters of cephalosporin C and its derivatives but in such processes consideration must be given in the process conditions to the relative instability of the penicillin β-lactam ring, or to the much more complex reactions involved in processing imino halides of Cephalosporin C and its derivatives.

For reasons of economy, the imino halide is preferably the imino chloride and the hydrogen halide reactant is preferably the hydrogen chloride. However, the imino halide can be the imino bromide, imino fluoride, or imino iodide. Similarly, the hydrogen halide can be the hydrogen bromide, hydrogen fluoride or hydrogen iodide. It is preferred to mix and react the imino halide reactant with from 2 to 3 moles of the alpha or beta diol or dithiol as described above. More preferably, the mole ratio should be about 2.5 moles of the diol per mole of the imino halide reactant in the inert organic solvent medium. The reactants can be combined by addition of the diol to the imino halide reaction mixture, or by adding the imino halide, inert, organic liquid diluent, and hydrogen halide mixture to the diol. The hydrogen halide can be provided to the mixture by the phosphorus pentachloride or other halogenating agent which was used to prepare the imino halide. The hydrogen halide can be generated in situ by reaction of some of the halogenating agents such as phosphorus pentachloride with some of the alcohol. The hydrogen halide may also be supplied to the reaction mixture by separate addition, e.g., by the addition of hydrogen chloride. At least a chemical equivalent of hydrogen halide should be used, preferably a molar excess of hydrogen halide, to insure optimum formation of the nucleus ester salt product (IV).

Examples of inert organic diluents which can be used to provide the bulk of the reaction mixture include methylene chloride, chloroform, methylchloroform, dichloroethane, carbon tetrachloride, tetrahydrofuran, dioxane, dimethoxyethane, benzene, toluene, xylene, chlorobenzene, and the like.

The imino halides of 7-acylamidodesacetoxycephalosporinate ester starting materials for the process of this invention can be obtained from a variety of sources. Natural or semisynthetic penicillins can be used to prepare these materials by the procedures referred to above. The most practical penicillins for this purpose are the phenoxymethyl penicillin (penicillin V), benzyl penicillin (penicillin G), and other penicillins which are produced commercially. Numerous examples of penicillins are given in the prior art, for example, as illustrated by the Behrens U.S. Pat. Nos. 2,479,295 to 2,479,297, 2,562,407 to 2,562,411 and 2,623,876. Examples of other penicillins which can be used include 2-thienylmethyl penicillin, penicillin N, phenylisopropyl penicillin, phenoxyisopropyl penicillin, phenyl-1-ethyl penicillin and the like. In preparing penicillins for use in this process, the penicillin can be oxidized to the penicillin sulfoxide and esterified to form the penicillin sulfoxide ester. Alternatively, the penicillin can be esterified and then oxidized to form the penicillin sulfoxide esters by procedures now known. The penicillin sulfoxide ester can be converted by the Morin/Jackson rearrangement process, as improved. For example, it can be heated in the presence of a sulfonic acid to 80°C. to 150°C. in the presence of a tertiary carboxamide while removing water from the reaction mixture as disclosed by the Hatfield U.S. Pat. No. 3,591,585 to form the 7-acylamidodesacetoxycephalosporinate ester. The 7-acylamidodesacetoxycephalosporinate ester can be reacted with phosphorus pentachloride or other halogenating agent by methods described in the above referenced patents to form the imino chloride of the 7-acylamidodesacetoxycephalosporinate ester.

The ester groups for use in converting a penicillin to imino halide of the 7-acylamidodesacetoxycephalosporinate ester starting material can be any group which will assist the precipitation of the 7-aminodesacetoxycephalosporinate ester hydrohalide salt from the substantially anhydrous organic liquid medium in which it is generated or made. Preferred starting materials could thus be described as being imino chlorides of 7-acylamidodesacetoxycephalosporinate esters of the formula

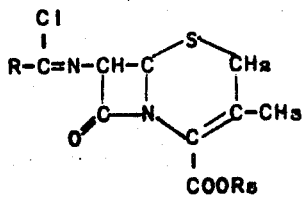

where R is a residue of the acyl group of a penicillin from which the 7-acylamidodesacetoxycephalosporinate ester was derived, and $R_5$ is the residue of an ester group such as nitrobenzyl, $C_4$ to $C_6$-tertiary alkyl, $C_5$ to $C_7$-tertiary alkenyl, $C_5$ to $C_7$-tertiary alkynyl, methoxybenzyl, 2,2,2-trichloroethyl, phthalimidomethyl, succinimidomethyl, benzhydryl, phenacyl, and the like. For the obtention of solid, crystalline ester salt products we prefer to use p-nitrobenzyl ester in preparing the starting materials and in this process. For reasons of economy we prefer to use the imino chloride of the p-nitrobenzyl ester of 7-phenoxyacetamido-3-methyl-3-cephem-4-carboxylate (from penicillin V) or the imino chloride of the p-nitrobenzyl 7-phenylacetamido-3-methyl-3-cephem-4-carboxylate (from penicillin G). However, we also contemplate the use of this process with the imino chloride of esters of desacetoxycephalosporin C [7-(5'-aminoadipoylamido)-3-methyl-3-cephem-4-carboxylic acid] and its derivatives, to form the 7-aminodesacetoxycephalosporinate ester salt products.

Examples of beta diols which can be used in this process include 1,3-propanediol,
1,3-butanediol,
1,3-pentanediol,
2,2-dimethyl-1,3-propanediol,
2,2-diethyl-1,3-propanediol,
2,4-pentanediol,
2,2-diphenyl-1,3-propanediol,
2,2-bis(p-methylphenyl)-1,3-propanediol, and corresponding dithiols and mixed thiol-alcohols.

Examples of alpha diols which can be used include
ethylene glycol,
1,2-propylene glycol
2,3-butanediol
1,2-butanediol,
3,4-pentanediol
3,4-hexanediol, and the corresponding dithiols, and mixed thiol-alcohols.

By this invention, I have discovered that nearly theoretical yields (over 90%) of 7-aminodesacetoxycephalosporinate ester hydrohalides can be obtained by minimizing the reversion of the imino halides to the 7-acylamido compound from which the imino halide is made. By the use of selected diols defined above I have provided those in the penicillin and cephalosporin cleavage art with an improved cleavage process which is not sensitive to temperature variations, is more efficient in the use of the diol reactant and in the preferred cases provides the desired 7-aminodesacetoxycephalosporinate ester hydrohalide salts as solid, crystalline materials which crystallize directly from the reaction mixture.

I do not wish to be bound to any particular theory but I believe that these defined diols provide, in addition to the formation of the imino ether, referred to in the prior art, intramolecular formation of a cyclic aminal. When a beta diol is used, the aminal is a six-membered ring intermediate and when an alpha diol is used a five-membered ring forms. The more favored six-membered ring with the beta diol probably accounts for the slight increase in yield of cleavage product over the five-membered ring from the alpha diol.

In general, starting materials, intermediates and products are named herein by the cephalosporanic acid or desacetoxycephalosporanic acid nomenclature system. Known antibiotics are named by their generic names, if available. Sometimes, for convenience, specific starting materials, intermediates or products are named by use of the "penam" or "cepham" nomenclature system. The penam nomenclature for the penicillins is described by Sheehan, et al. in the *Journal of the American Chemical Society*, (JACS), 75, 3292, Footnote 2, (1953). This nomenclature system was adapted to the cephalosporins by Morin. et. al. in *JACS*, 84, 3400 (1962). In accordance with these systems of nomenclature penam and cepham refer respectively to the following saturated ring systems:

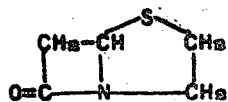

Penam

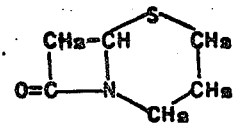

Cepham

The term "cephem" refers to the cepham ring structure containing a double bond, the position of which is indicated by an integer prefix or a prefix "Δ" with a superscript before the word cephem denoting the lowest numbered carbon atom to which the double bond is connected. Thus, for example, penicillin V can be named 6-phenoxyacetamido-2,2-dimethylpenam-3-carboxylic acid. A product of the improved process of this invention, p-nitrobenzyl 7-aminodesacetoxycephalosporinate hydrochloride, can be named p-nitrobenzyl 7-amino-3-methyl-3-cephem-4-carboxylate hydrochloride. The invention is further illustrated by the following detailed examples.

EXAMPLE 1

A. In situ preparation of imino chloride

Pyridine, 1.01 ml. (0.0125 mole) and phosphorus pentachloride (0.0115 mole) are added, with stirring, to a solution of 4.84 g. (0.0100 mole) of 4-nitrobenzyl 7-phenoxyacetamido-3-methyl-3-cephem-4-carboxylate in 50 ml. of methylene chloride at 15°C. The resulting solution was stirred for 2.5 hours at 20°C. in the absence of atmospheric moisture. These conditions are believed to be optimum for the conversion to the imino chloride of 4-nitrobenzyl 7-phenoxyacetamido-3-methyl-3-cephem -4-carboxylate. This procedure was used for generation of the solution containing 0.010 mole of the imino chloride reactant for the examples which follow. Material prepared in this manner was used for most of the following examples.

B. Isolation of Imino chloride (I)

The solution from part (A) above was cooled to −15°C. and pyridine, 3.56 ml. (0.044 mole) was added followed by 5.0 ml. (0.124 mole) of absolute methanol. This solution was stirred 10 minutes at −15° to −10°C. and then poured into 50 ml. of cold, deionized water. Layers were separated and the methylene chloride layer was washed with four 50 ml. portions of cold water and then dried over anhydrous sodium sulfate. The dried solution was concentrated under vacuum and the residue was crystallized by addition of anhydrous ethyl ether. The resulting solid was filtered, washed with ethyl ether and vacuum dried at 50°C. The yield of the imino chloride of 4-nitrobenzyl 7-phenoxyacetamido-3-methyl-3-cephem-4-carboxylate (I) was 3.96 g. (79% yield), m.p. 121°-2°C. This compound was characterized by infrared, ultraviolet, nuclear magnetic resonance, and mass spectroscopy, and by elemental analysis:

|  | %C | %H | %N | %S | %C |
|---|---|---|---|---|---|
| Theory | 55.04 | 4.02 | 8.37 | 6.39 | 7.06 |
| Found | 54.97 | 4.14 | 8.31 | 6.58 | 7.40 |

C. Effect of various alcohols

The imino chloride, from part B, 0.50 g. (1 millimole), in 5.0 ml. of dry acetone at 25°C. was treated with 3 mmoles of water or one of the alcohols listed in Table I. In each case, any 4-nitrobenzyl 7-amino-3-methyl-3-cephem-4-carboxylate hydrochloride (VI) crystallized directly and was filtered and dried. Any 4-nitrobenzyl 7-phenoxyacetamido-3-methyl-3-cephem-4-carboxylate (V), reversion product, was isolated by concentration of the filtrate and crystallized from 5 ml. of methanol. Yield data are summarized in Table I which follows.

Table 1

| Reagent | Percent Yield | |
|---|---|---|
|  | VI 7-amino nucleus ester salt | V amide |
| Water | — | 89 |
| Methanol | 75 | 25 |
| Isopropanol | 62 | 35 |
| Tertiary-Butanol | — | 96 |
| Benzyl Alcohol | 52 | 41 |
| p-Nitrobenzyl alcohol | 52 | 35 |
| p-Methoxybenzyl alcohol | — | 91 |

Depending upon the nature of the alcohol, the imino chloride can undergo cleavage to the nucleus ester or reversion to the amide starting material.

D. Methanol Concentration

Methanol and n-butanol are two alcohols which have been used in prior art processes for the alcoholysis step. In these reactions gross excesses of methanol and n-butanol are normally used. FIG. 1 is a graph showing that the amount of methanol required for optimum cleavage at 25°C. is 12.4 to 15 moles per mole of imino chloride, prepared as described in Example 1A, above.

Figure 2:
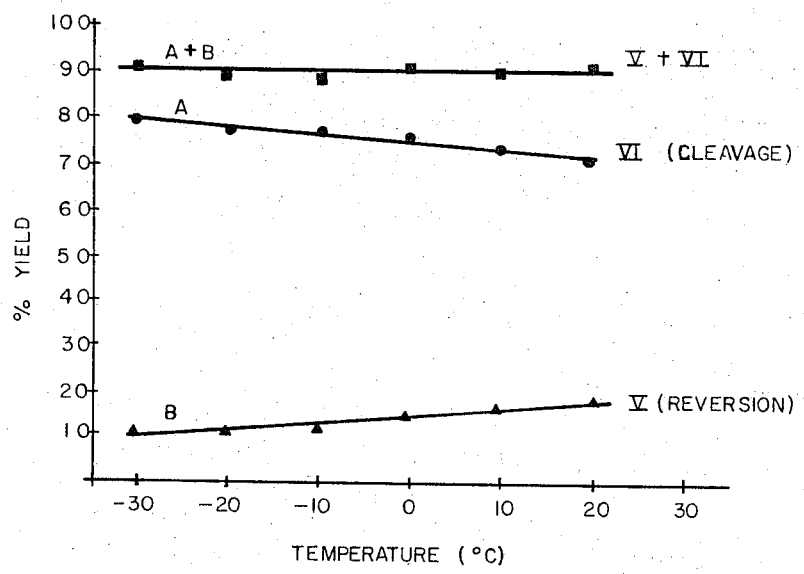
FIG. 2 shows in three line graphs, plotting temperature in degrees Centigrade (abscissa) against percentage yields of the products obtained (ordinate), showing the effect of temperature on the use of methanol to effect conversion of the imino chloride of p-nitrobenzyl 7-phenoxyacetamido-3-methyl-3-cephem-4-carboxylate (I) to cleavage product VI [p-nitrobenzyl 7-amino-3-methyl-3-cephem-4-carboxylate hydrochloride], line A, or reversion product V [p-nitrobenzyl 7-phenoxyacetamido-3-methyl-3-cephem-4-carboxylate], line B. Line A + B shows the sum of yields of cleavage product VI and reversion product V.
Figure 3:
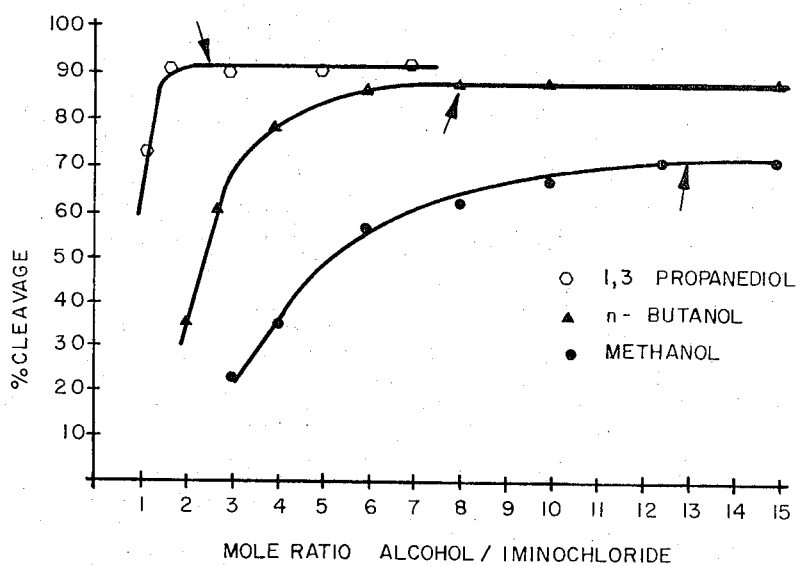
FIG. 3 is a graph plotting the mole ratio of alcohol/imino chloride (abscissa) against the percent cleavage obtained (ordinate) for methanol, n-butanol, and 1,3-propanediol. The arrows to points on each line depict the optimum mole ratio of each alcohol or diol.

Using the concentration of methanol determined in FIG. 1 to be optimum (12.4 moles per mole of imino chloride), the temperature of the methanolysis reaction was varied. As illustrated in FIG. 2, an increase in temperature resulted in a decrease in yield of a cleavage product (VI) and a corresponding increase in the yield of the amide (V) due to the reversion reaction. The material balance (VI plus V) remains essentially constant over the range of −30°C. to 20°C.

EXAMPLE 2

In this example a solution of 0.010 moles of the 4-nitrobenzyl 7-phenoxyacetamido-3-methyl-3-cephem-4-carboxylate imino chloride prepared as described in Example 1, part A, was reacted with various diols and dithiols at −10°C. and with some triols and tetraols at 25°C. to determine the percent cleavage and the percent reversion obtained in each reaction. The results are summarized in the following table.

Table II -- Diols and Dithiols, Triols and Tetraols

| COMPOUND | (Moles) | TEMP.(°C.) | VI %CLEAVAGE | V %REVERSION |
|---|---|---|---|---|
| HO-(CH$_2$)$_n$-OH | | | | |
| n=2 | (0.090) | -10 | 87 | 2 |

Table II — Diols and Dithiols, Triols and Tetraols—Continued

| COMPOUND | (Moles) | TEMP. (°C.) | VI %CLEAVAGE | V %REVERSION |
|---|---|---|---|---|
| 2 | (0.090) | 25 | 86 | 3 |
| 3 | (0.030) | -10 | 93 | - |
| 3 | (0.030) | 25 | 94 | - |
| HO-CH$_2$-CH-OH<br>　　　　　CH$_3$ | (0.030) | 25 | 91 | - |
| HO-CH-CH-OH<br>　　CH$_3$ CH$_3$ | (0.030) | 25 | 90 | - |
| HS-CH$_2$-CH$_2$-SH | (0.060) | 25 | 90 | - |

EXAMPLE 3

Secondary alcohols lead to more reversion than cleavage which fact is illustrated by the data in the table below: In this example the solution of 0.010 mole of the imino chloride of 4-nitrobenzyl 7-phenoxyacetamido-3-methyl-3-cephem-4-carboxylate was treated with the indicated secondary alcohols.

Table III — Secondary alcohols

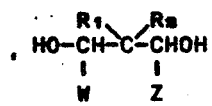

at 25°C.

| Secondary Alcohol | | (Moles) | % Cleavage VI | % Reversion V |
|---|---|---|---|---|
| R$_1$ | R$_2$ | | | |
| CH$_3$ | CH$_3$ | (0.060) | 57 | 35 |
| CH$_3$ | n—C$_3$H$_7$ | (0.060) | — | 84 |
| —(—CH$_2$—)$_4$— | | (0.060) | 49 | 39 |
| (—CH$_2$—)$_5$ | | (0.060) | 63 | 25 |

EXAMPLE 4

In this example the p-nitrobenzyl 7-phenoxyacetamido-3-methyl-3-cephem-4-carboxylate ester imino chloride as prepared in Part A in Example 1, was reacted with 0.030 mole of one of the diol compounds of the formula

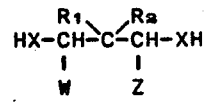

TABLE IV

| | | | | VI | V |
|---|---|---|---|---|---|
| 1,3-DIOLS at 25°C | | | | | |
| R$_1$ | R$_2$ | W | Z | %CLEAV-AGE | %REVER-SION |
| H | H | H | H | 94 | — |
| CH$_3$— | CH$_3$— | H | H | 92 | — |
| C$_2$H$_5$— | C$_2$H$_5$— | H | H | 95 | — |
| C$_6$H$_5$— | C$_6$H$_5$— | H | H | 94 | — |
| H | H | H | CH$_3$ | 94 | — |

Further evidence for the fact that the reaction of the imino chloride with diols is intramolecular resides in the fact that the γ-chloroester biproduct, γ-chloropropyl phenoxyacetate from cleavage of the phenoxyacetyl side chain was isolated and characterized.

I claim:

1. A process for preparing solid, crystalline p-nitrobenzyl 7-amino-3-methyl-3-cephem-4-carboxylate hydrochloride which comprises reacting the imino chloride of a p-nitrobenzyl 7-acylamido-3-methyl-3-cephem-4-carboxylate with from 2 to 3 moles of a diol selected from the group consisting of (a) a beta diol of the formula

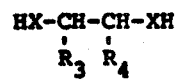

wherein each X is oxygen or sulfur, each of W and Z is hydrogen or C$_1$ to C$_2$-alkyl and each of R$_1$ and R$_2$ is hydrogen or a hydrocarbon moiety such that the 1,3-diol has from 3 to 15 carbon atoms; or (b) an alpha diol of the formula

HX-CH-CH-XH
　　R$_3$　R$_4$ wherein each X is oxygen or sulfur, and each of R$_3$ and R$_4$ is hydrogen or alkyl such that the molecule has from 2 to 12 carbon atoms, in an inert, organic liquid solvent in the presence of hydrogen halide.

2. A process as defined in claim 1 wherein a beta diol is reacted with the imino chloride of p-nitrobenzyl 7-phenoxyacetamido-3-methyl-3-cephem-4-carboxylate to form p-nitrobenzyl 7-amino-3-methyl-3-cephem-4-carboxylate hydrochloride.

3. A process as defined in claim 1 wherein an alpha diol is contacted with p-nitrobenzyl 7-phenylacetamido-3-methyl-3-cephem-4-carboxylate to form as product p-nitrobenzyl 7-amino-3-methyl-3-cephem-4-carboxylate hydrochloride.

4. A process for preparing a 7-amino-3-methyl-3-cephem-4-carboxylate ester hydrohalide which comprises reacting an imino halide of a 7-acylamido-3-methyl-3-cephem-4-carboxylate ester in an inert organic liquid solvent in the presence of hydrogen halide with (a) a beta diol of the formula

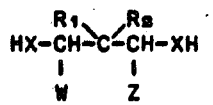

wherein each X is oxygen or sulfur,, each of W and Z is hydrogen or $C_1$ to $C_2$-alkyl, and each of $R_1$ and $R_2$ is hydrogen or a hydrocarbon moiety such that the 1,3-diol has from 3 to 15 carbon atoms; or (b) an alpha diol of the formula

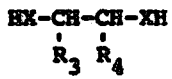

wherein each X is oxygen or sulfur, and each of $R_3$ and $R_4$ is hydrogen or alkyl such that the molecule has from 2 to 12 carbon atoms.

5. A process as defined in claim 4 wherein the selected imino halide is reacted with from 2 to 3 moles from a beta diol of the formula

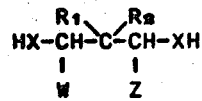

wherein each X is oxygen or sulfur, each of W and Z is hydrogen or $C_1$ to $C_2$-alkyl and each of $R_1$ and $R_2$ is hydrogen or a hydrocarbon moiety such that the 1,3-diol has from 3 to 15 carbon atoms per mole of imino halide.

6. A process as defined in claim 4 wherein the selected imino halide is reacted with from 2 to 3 moles of an alpha diol of the formula

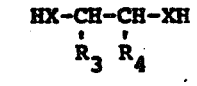

wherein each X is oxygen or sulfur and each of $R_3$ and $R_4$ is hydrogen or alkyl such that the alkanediol has from 2 to 12 carbon atoms, per mole of the imino halide.

7. A process as defined in claim 4 wherein the diol is 1,2-propanediol.

* * * * *